(12) United States Patent
Angelosanto et al.

(10) Patent No.: US 8,176,932 B2
(45) Date of Patent: May 15, 2012

(54) DEFINED LEAK PATH FOR HIGH PRESSURE SEAL

(75) Inventors: John Angelosanto, North Attleboro, MA (US); Joseph A. Luongo, Walpole, MA (US); Frank Rubino, North Attleboro, MA (US)

(73) Assignee: Waters Technologies Corporation, Milford, MA (US)

( * ) Notice: Subject to any disclaimer, the term of this patent is extended or adjusted under 35 U.S.C. 154(b) by 278 days.

(21) Appl. No.: 12/652,271

(22) Filed: Jan. 5, 2010

(65) Prior Publication Data

US 2010/0108164 A1 May 6, 2010

Related U.S. Application Data

(62) Division of application No. 11/573,742, filed as application No. PCT/US2005/029205 on Aug. 17, 2005, now Pat. No. 7,665,480.

(60) Provisional application No. 60/602,376, filed on Aug. 18, 2004.

(51) Int. Cl.
*F16L 35/00* (2006.01)
(52) U.S. Cl. ............... 137/312; 137/800; 277/320
(58) Field of Classification Search .......... 137/312, 137/800, 15.11; 277/320
See application file for complete search history.

(56) References Cited

U.S. PATENT DOCUMENTS

| 4,398,727 | A | | 8/1983 | Rylander | |
|---|---|---|---|---|---|
| 5,090,871 | A | | 2/1992 | Story et al. | |
| 5,170,659 | A | * | 12/1992 | Kemp | 137/312 |
| 5,197,766 | A | * | 3/1993 | Glover et al. | 285/14 |
| 5,520,209 | A | * | 5/1996 | Goins et al. | 137/312 |
| 5,788,465 | A | | 8/1998 | Luongo et al. | |
| 5,941,530 | A | | 8/1999 | Williams | |
| 6,000,422 | A | | 12/1999 | Shigemoto | |
| 6,962,348 | B2 | | 11/2005 | Fink | |
| 7,509,841 | B2 | | 3/2009 | Spaolonzi et al. | |

FOREIGN PATENT DOCUMENTS

| JP | 5215243 | 8/1993 |
|---|---|---|
| JP | 2002039083 | 2/2002 |
| JP | 2006507462 | 3/2006 |

OTHER PUBLICATIONS

Translation of Notice of Rejection (Official Action) for Japanese Patent Applicatioon No. 2007-527964, dated Jul. 5, 2011.

\* cited by examiner

*Primary Examiner* — Kevin Lee
(74) *Attorney, Agent, or Firm* — Waters Technologies Corporation

(57) ABSTRACT

Embodiments of the present invention are directed to methods and devices for conveying or containing fluids under pressure in which seals are provided with a defined path to vent fluid in the event of a seal failure.

6 Claims, 3 Drawing Sheets

DEFINED LEAK PATH FOR HIGH PRESSURE SEAL

CROSS REFERENCE RELATED APPLICATION

This application is a divisional of U.S. patent application Ser. No. 11/573,742, filed on Aug. 22, 2007, now U.S. Pat. No. 7,665,480, which is a continuation of PCT/US2005/029205, filed Aug. 17, 2005 and U.S. Provisional Application Ser. No. 60/602,376, filed Aug. 18, 2004. The entire contents of these applications are incorporated herein by reference.

STATEMENT REGARDING FEDERALLY FUNDED RESEARCH AND DEVELOPMENT

N/A

FIELD OF INVENTION

The present invention relates to the field of fluid handling devices.

BACKGROUND OF THE INVENTION

The present invention is directed to devices for handling fluids under pressure. For example, without limitation, embodiments of the present invention have application for pumps and valves that produce or control fluids under pressure. Devices for handling high pressures are built with parts and components with closely controlled tolerances. Such parts and components are also expensive to manufacture. It is desirable to be able to design components and parts which exhibit wear such that the worn parts and components can be replaced. And, it is desirable to reuse parts and components with closely controlled tolerances.

Unfortunately, worn parts and components may cease functioning prior to replacement. The function of many parts and components of fluid handling devices is to contain fluid under pressure. For example, the failure of seals in a valve or pump may release fluid into sections of the device which can not withstand the pressure and/or pulsation of the fluid. The parts and components to which a pressurized fluid is inappropriately applied may work free or change alignment from other components and parts. Specialized pumps for performing chromatography often have sapphire pistons. Mis-aligned pistons may gouge precision surfaces of such pumps. The pistons may be scratched or otherwise damaged. Parts and components to which inappropriate pressure is applied may permanently deform.

In the field of chromatography, there is an interest in operating at elevated pressures. Conventional pressures for performing high performance liquid chromatography are up to approximately 3,000 pounds per square inch (psi). Pressures for performing ultra performance liquid chromatography may reach 15,000 to 20,000 psi. With greater pressure, the potential for seal failure is greater and the potential for damage is greater.

It would be desirable to have parts and components of fluid handling devices convey fluids to the exterior of the device in a manner that does not allow inappropriate pressure to be applied to parts and components.

SUMMARY OF THE INVENTION

Embodiments of the present invention are directed to devices and methods for directing fluids away from surfaces with closely controlled tolerances to prevent damage in the event of a leak. One embodiment of the present invention is directed to a device for producing or conveying fluids under pressure. The device comprises a housing having a housing exterior, cap abutment surface, a chamber and a bore opening. The chamber is for containing fluid under pressure. The cap abutment surface is an area of the housing apart from the exterior that surrounds the bore opening for receiving a cap. The bore opening extends from the cap abutment surface to the chamber. The bore opening has a sealing surface and at least one housing seal compression surface. A seal is held in the bore opening. The seal has a seal opening and a housing engagement surface, said seal opening for receiving a shaft extending axially there-through. The seal sealing engaging said housing engagement surface against said sealing surface upon axial compression of the seal against said seal compression surface. The device further comprises a shaft having a shaft axis and mounted in the seal opening of the seal. The shaft is for rotation about the shaft axis or movement along the shaft axis. The device further comprises a cap having a cap exterior, housing abutment surface, a cap opening and a cap seal compression surface. The cap is affixed to the housing with the housing abutment surface engaging the cap abutment surface. The shaft extends through the cap opening and the cap seal compression surface is pressed against the seal compelling the seal against the seal compression surface to sealing engage the housing engagement surface against the sealing surface. The device further comprises a passage means for receiving and conveying fluid from said housing engagement surface to at least one of the cap exterior or the housing exterior and away from the cap is abutment surface and the housing abutment surface.

Typically, the cap abutment surface and housing abutment surface influence the relationship of other components and parts. For example, the misalignment of the cap with respect to the housing will cause a corresponding misalignment of the shaft in the seal opening, cap opening and the bore opening. This misalignment can lead to undue expensive wear and damage to the these components. The passage means of the present invention directs fluids which are under pressure, away from this sensitive area.

The passage means of one embodiment of the present invention is a channel in at least one of the housing or cap. A preferred passage means is incorporated in the seal. Preferably, the seal has a flexible body section and a seal compression pad. The body section is for engaging the housing engagement surface. The seal compression pad has less flexibility than the flexible body section to compress the flexible section against said seal compression surface. Preferably, the seal compression pad has a cap engaging surface. A preferred passage means is at least one channel in the cap engaging surface. The channel preferably extends radially across the cap engaging surface from the cap opening.

In the alternative, one embodiment of the present invention has at least one channel in said seal compression surface of the cap.

The device of the present inventions may comprise a pump, wherein the housing is a pump housing, or a valve, wherein the housing is a valve housing. In pump applications, the shaft may rotate or move in or out of the chamber to compel fluid movement. For example, without limitation, the shaft may comprise a reciprocating piston within the chamber.

The device of the present invention has particular utility in pump and valve applications with fluids under high pressure and ultra high pressure.

A further embodiment of the present invention comprises a method of producing or conveying fluids under pressure. The method comprising the steps of providing a device having a housing having a housing exterior, cap abutment surface, a chamber and a bore opening. The chamber is for containing a fluid under pressure. The cap abutment surface is a area of the housing apart from the exterior surrounding the bore opening for receiving a cap. The bore opening extending from cap abutment area to the chamber. The bore opening has a sealing surface and at least one housing seal compression surface.

The device further comprises a seal held in the bore opening. The seal has a seal opening and a housing engagement surface. The seal opening is for receiving a shaft extending axially therethrough. The seal sealing engages the housing engagement surface against said sealing surface upon axial compression of the seal against said seal compression surface. A shaft, having a shaft axis, is mounted in the seal opening of the seal for rotation about said shaft axis or movement along a shaft axis.

A cap having a cap exterior, housing abutment surface, a cap opening and a cap seal compression surface, is affixed to the housing with the housing abutment surface engaging the cap abutment surface. The shaft extends through the cap opening. The cap seal compression surface is pressed against the seal compelling the seal against the seal compression surface to sealing engage the housing engagement surface against the sealing surface. The device provides passage means from the housing engagement surface to at least one of the cap exterior or the housing exterior and removed from the cap abutment surface and the housing abutment surface.

The method further comprises the step of operating such device such that fluid from the housing engagement surface is directed to the exterior of the cap or the exterior of the housing and away from the cap abutment surface and the housing abutment surface.

The passage means may take several forms. For example, the passage means may comprise a channel in at least one of the housing or cap. Or, the passage means may be incorporated in the seal. A preferred seal has a flexible section and a seal compression pad. The flexible section is for engaging the housing engagement surface. The seal compression pad has less flexibility than the flexible section to compress said flexible section against said seal compression surface. A channel is provided in the seal compression pad to direct fluids to the exterior of the housing or cap. Where the housing is a pump or valve housing, embodiments of the present invention prevent major damage in the event seals leak.

A further embodiment of the present invention is directed to a seal for use in a device for producing or conveying fluids under pressure. The seal comprises a seal body constructed and arranged to be received in a bore opening of a housing. The housing has a housing exterior, cap abutment surface, a chamber and a bore opening. The chamber is for containing fluid under pressure. The bore opening extends from the cap abutment surface to the chamber. The bore opening also has a sealing surface and at least one housing seal compression surface. The cap abutment surface surrounds the bore opening for receiving a cap. The seal body has a seal opening for receiving a shaft extending axially there-through. The shaft has a shaft axis and is constructed and arranged to be mounted in the seal opening of the seal for rotation about the shaft axis or movement along a shaft axis. The seal body has a housing engagement surface, a seal pad and a seal surface. The housing engagement surface is constructed and arranged for engaging the housing seal compression surface. The seal surface, upon axial compression of the seal body against the seal compression surface, sealing engages the sealing surface of the bore opening. The seal further comprises a cap pad affixed to the seal body. The cap pad has a cap pad opening constructed and arranged to cooperate with the seal body opening. The cap pad has a rigidity greater than the rigidity of the seal body to convey compressive force to the seal body. The cap pad has a cap engaging surface for receiving a cap seal compression surface of a cap. The cap has a cap exterior, housing abutment surface, a cap opening and a cap seal compression surface. The cap is constructed and arranged to be affixed to the housing with the housing abutment surface engaging the cap abutment surface and the shaft extending through said cap opening. The cap seal compression surface is pressed against the cap engaging surface compelling the seal surface to engage said housing engagement surface against the sealing surface. The seal further comprises passage means for receiving and conveying fluid from the housing engagement surface to at least one of the cap exterior or the housing exterior and away from said cap abutment surface and said housing abutment surface.

A preferred passage means is at least one channel in the cap engaging surface.

Embodiments of the present invention provide a defined path for fluids which leak past seal surfaces and prevent the build up of pressure between parts of pumps and valve assemblies. This build up of pressure can result is miss-aligned parts and components which parts and components may be subject to stresses which they can not withstand or result in wear.

These and other features and advantages will be apparent to those skilled in the art upon viewing the drawings and the detailed description that follow.

DETAILED DESCRIPTION OF THE INVENTION

Embodiments of the present invention will now be described with respect to the Figures with the understanding that the embodiments described are preferred embodiments. For example, without limitation, the following discussion will describe a pump assembly with the understanding that the invention applies to valves and other fittings as well.

Figure 1:
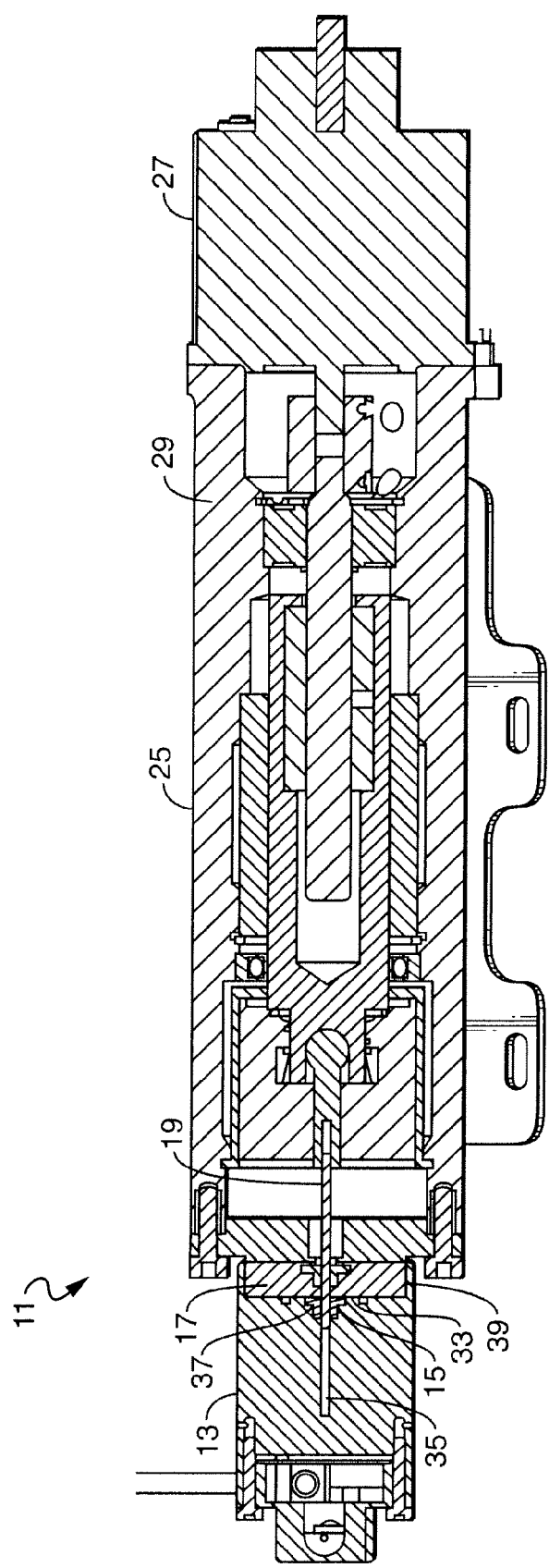
FIG. 1 depicts, in cross section, a device incorporating features of the present invention.
Figure 2:
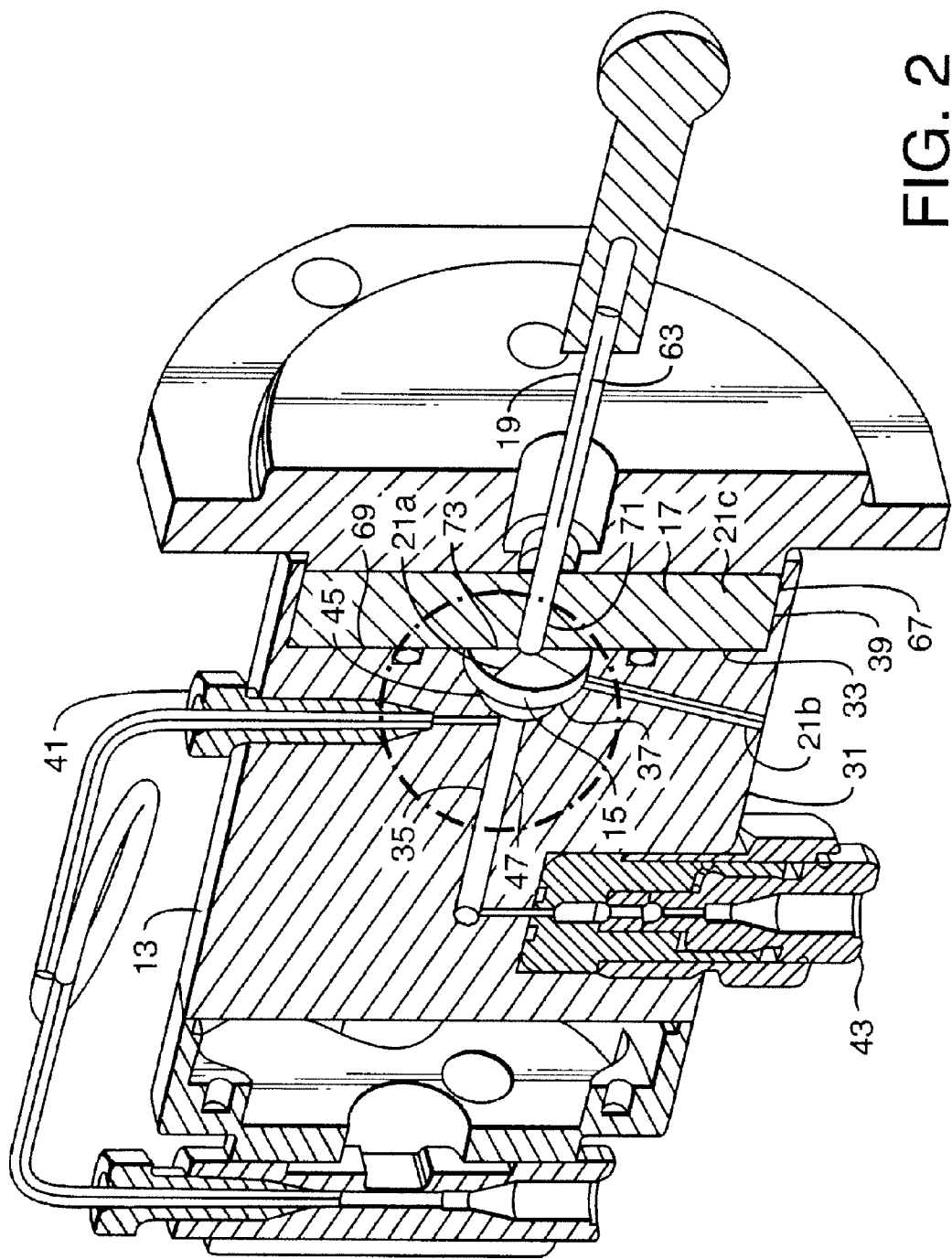
FIG. 2 depicts, in cross section, the pump assembly of a device depicted in FIG. 1.

Turning now to FIG. 1, a device, in the form of a pump, generally designated by the numeral 11 is depicted. The device 11 has a housing 13, a seal 15, a cap 17, shaft 19 and passage means 21a, 21b, and 21c as best seen in FIG. 2. Returning now to FIG. 1, device 11, as a pump, produces fluids under pressure. However, features of device 11 may be modified such that the device could direct fluids to different fluid paths in the nature of a valve or fitting.

The housing 13 is part of a pump assembly 25 having a motor 27 and spindle mechanism 29. Those skilled in the art will recognize that housing 13 could be described as a housing for a valve [not shown] in which the spindle mechanism 29 would normally comprise suitable gearing and the like. As depicted, spindle mechanism 29 is mechanically linked to a shaft 19.

Housing 13 is depicted in greater detail in FIG. 2. Housing 13 has a housing exterior 31, a cap abutment surface 33, a chamber 35 and a bore opening 37. The cap abutment surface 33 comprises an area of the housing 13, separate from the exterior 31, surrounding the bore opening 37, for receiving a cap 17. The housing 13 has a cap recess 39 to align the cap 17.

Chamber 35 is for containing fluid under pressure. As a pump, the shaft 19 moves in and out of the chamber 35 causing fluids to move. As a valve, it would be more common that the shaft 19 rotate and turn a rotor [not shown] fitted to a stator [not shown]. As depicted, chamber 35 has an inlet 43 and an outlet 41 for receiving and discharging fluids.

Bore opening 37 extends from the cap abutment surface 33 to the chamber 35. Bore opening 37 may be substantially contiguous with chamber 35. Bore opening 37 has a sealing surface 45 and at least one housing seal compression surface 47. Sealing surface 45 is for creating a seal between the housing 13 and seal 15. Housing seal compression surface 47 is for creating a compressive force on the seal 15 which will compel the seal 15 against the sealing surface 45.

Figure 3:
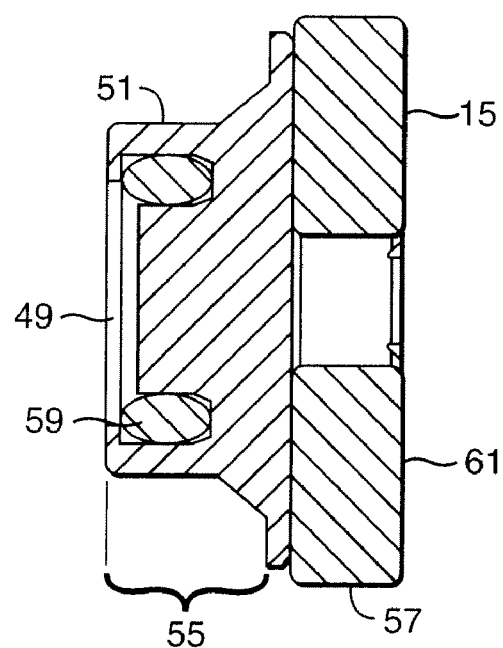
FIG. 3 depicts, in cross section, a seal incorporating features of the present invention.
Figure 4:
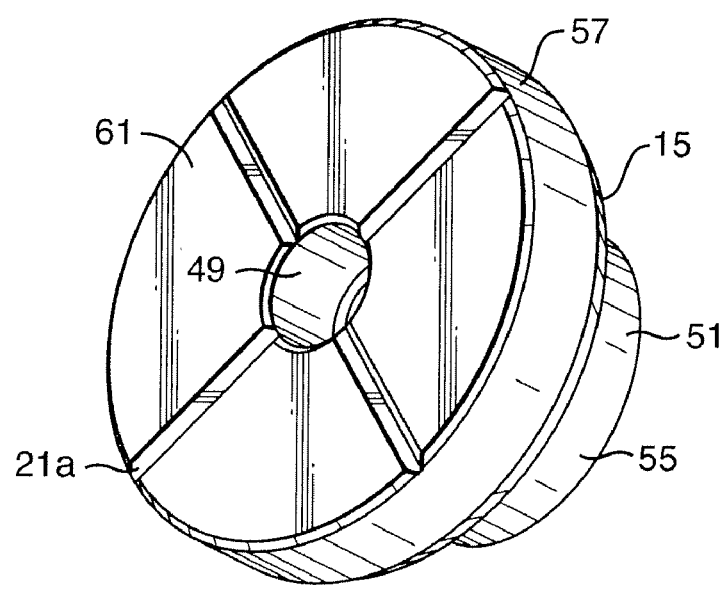
FIG. 4 depicts an angled view of the seal depicted in FIG. 3.

Seal 15 is held in the bore opening 37. As best seen in FIGS. 3 and 4, the seal 15 has a seal opening 49 and a housing engagement surface 51. The seal opening 49 receives shaft 19 extending axially there-through. The surface of the seal opening 49 sealing engages the shaft to prevent fluid from escaping the chamber 35. The housing engagement surface 51 sealing engages the sealing surface 45 of the bore opening 37 upon axial compression of the seal 15 against the housing seal compression surface 47.

Seal 15 has a seal body 55 and a seal compression pad 57. The seal body 55 is a flexible section that engages the sealing surface 45 of the bore opening 37. The seal body 55 has a canted coil spring 59. Canted coiled spring 59 creates radial force directed inward and outward upon compression of the seal 15 against the housing seal compression surface 47. This radial force facilitates the sealing engagement of the housing engagement surface 51 with the sealing surface 45 of the housing 13. However, seal 15, holding pressure up to 15,000 psi, may fail. Upon failure, the fluid leaks to areas of the pump until an outlet is reached, or if confronted with a sealed area, the fluids will build up pressure. However, the pressure may build in areas of the device 11 which are pressure sensitive.

Seal compression pad 57 has less flexibility than seal body 55 to compress the seal body 55 against the housing seal compression surface 47. The seal compression pad 57 is made of plastic, such as, by way example, without limitation, polyethylene ether ketone, (PEEK). The seal body 55 is made of rubber or rubber-like materials. The seal compression pad 57 has a cap engaging surface 61 for engaging the cap 17. It will be recognized by those skilled in the art, that the seal compression pad 57 may represent a area of a seal body that is more rigid than sections of the seal body performing sealing functions. That is, the seal cap 57 may be integral with the seal body 55.

Returning now to FIG. 2, shaft 19 has a shaft axis 63 extending lengthwise along the shaft. The shaft 19 is generally cylindrical and shaft 19 and seal 15 are constructed and arranged such that shaft 19 fits seal opening 49. Shaft 19 is mounted in the seal opening 49 of the seal 15 for rotation about said shaft axis 63 or reciprocating movement along a shaft axis 63.

Cap 17 has a cap exterior 67, housing abutment surface 69, a cap opening 71 and a cap seal compression surface 73. The cap exterior 67 is that part of the cap 17 other than housing abutment surface 69, cap opening 71 and cap seal compression surface 73. Cap 17 is affixed to the housing 13 with the housing abutment surface 69 engaging the cap abutment surface 33. The relationship of the housing 13 to the cap 17 is important. The cap 17 is to secured to other components as depicted in FIG. 1. Misalignment of the cap 17 with the housing 13 may cause extreme wear of moving components and may alter the shape of components not designed for pressure.

Returning now to FIG. 2, shaft 19 extends through the cap opening 71. Cap seal compression surface 73 is pressed against the seal 15 at the cap engaging surface 61 of the seal compression pad 57. The seal 15 is compelled against the seal compression surface 47 by the seal compression pad 57 to sealing engage the housing engagement surface 51 against the sealing surface 45.

Device 11 has passage means 21 for receiving and conveying fluid from the housing engagement surface 51 to at least one of the cap exterior 67 or the housing exterior 31 and away from the cap abutment surface 33 and the housing abutment surface 69. Passage means 21 may take several forms. For example, without limitation, one embodiment of passage means 21 is at least one channel 21b in a cap engaging surface 61 of the seal 15, and in particular, the seal compression pad 57 as best seen in FIG. 4.

In the alternative, channels [not shown] can be provided in the cap seal compression surface 72 of the cap 17. As a further alternative, returning again to FIG. 2, passage means 21 is a channel 21b in the housing 13. As a further alternative, a channel 21c is provided in the cap 17.

Embodiments of the present device prevent critical wear and damage to parts of a valve and/or pump or other fluid containing device in the event of a seal failure. These advantages and features may be realized with a seal 15 having a seal body 55 having channels 21a in a cap engaging surface 61 for pumps, valves and fittings.

Embodiments of the present invention directed to a method are discussed herein with respect to the manner of operation. One method of the present invention is directed to a method of producing or conveying fluids under pressure. The method comprises the steps of providing a device 11 having a housing 13 having a housing exterior 31, cap abutment surface 33, a chamber 35 and a bore opening 37. The chamber 35 is for containing fluid under pressure. The cap abutment surface 33 comprising an area separate from the housing exterior 31 and surrounding the bore opening 37 for receiving a cap 17. The bore opening 37 extends from the cap abutment surface 33 to the chamber 35 and has a sealing surface 45 and at least one housing seal compression surface 47. The device further comprises a seal 15 held in the bore opening 37. The seal 15 has a seal opening 49 and a housing engagement surface 51. The seal opening 49 receives a shaft 19 extending axially there-through. The seal 15 sealing engages the housing engagement surface 51 against the sealing surface 45 upon axial compression of the seal 15 against the seal compression surface 47. The device 11 further comprises a shaft 19 having a shaft axis 63 and mounted in the seal opening 49 of the seal 15 for rotation about the shaft axis 63 or movement along a shaft axis 63, for example a reciprocating inward and outward movement. The device 11 further has a cap 17 having a cap exterior 67, housing abutment surface 69, a cap opening 71 and a cap seal compression surface 73. The cap 17 is affixed to the housing 13 with the housing abutment surface 69 engaging the cap abutment surface 33 and the shaft 19 extending through the cap opening 71. The cap seal compression surface 73 presses against the seal 15 compelling the seal 15 against the seal compression surface 47 to sealing engage the housing engagement surface 51 against said sealing surface 45.

The device 11 further has passage means 21a, 21b or 21c from the housing engagement surface 51 to at least one of the cap exterior 67 or the housing exterior 31 and removed from the cap abutment surface 33 and the housing abutment surface 69.

The method further comprises the step of operating the device 11 such that fluid from the housing engagement surface 51 is directed to the cap exterior 67 or the housing exterior 31 and away from the cap abutment surface 33 and the housing abutment surface 69.

The method of the present invention can be performed by providing a device 11 or providing a seal 15 in a device 11. One further embodiment of the present invention is directed to such a seal 15. The seal 15 comprises a seal body 55 constructed and arranged to be received in a bore opening 37 of a housing 13. The bore opening 37 and the housing are as described previously. The seal body 55 has a seal opening 49 for receiving a shaft 19 extending axially there-through. The shaft 19 is a previously described. The seal body 55 has a housing engagement surface 51 for engaging the housing seal compression surface 47 of the housing 13 upon axial compression of the seal body 55. The seal 15 further comprises a cap pad 57 affixed to the seal body 55 or integral with the seal body 55. The cap pad 57 has the seal opening 49 extending therethrough for receiving the shaft 19. The cap pad 57 has a rigidity greater than the rigidity of said seal body 55 to convey compressive force to the seal body 55. The cap pad 57 has a cap engaging surface 61 for receiving a cap seal compression surface 73 of a cap 17. The features of the cap 17 are as previously described. And, such seal 15 comprising passage means 21a for receiving and conveying fluid from the housing engagement surface 51 to at least one of the cap exterior 67 or the housing exterior 31 and away from the cap abutment surface 33 and the housing abutment surface 69.

A preferred passage means is at least one channel 21a in the cap engaging surface 61.

Thus, while the preferred embodiments of the present invention have been described with respect to the Figures, those skilled in the art will recognize that the present invention is capable of being modified and altered without departing from the teaching of the present application. Therefore, the present invention should not be limited to the precise details herein but should encompass the subject matter of the following claims.

What is claimed is:

1. A high pressure fluidic device for a chromatography system, which device comprises a housing having a fluidic chamber for containing fluid under pressure and having an inlet and an outlet for the ingress and egress, respectively, of high pressure fluid, a piston operable in the chamber for causing movement of high pressure fluid therein, a seal disposed in a bore contiguous with the chamber and an end cap in abutment with one end of the housing which holds the seal under compression in sealing engagement within the bore, wherein the piston passes through the end cap and in sealing engagement through the seal and wherein a fluid relief passageway is provided to convey fluid, in the event of seal failure, from the sealing surfaces between the seal and the bore to at least one of the exterior of the cap or the exterior of the housing and away from abutment surfaces there between.

2. A device as claimed in claim 1, wherein said fluid relief passageway is provided in at least one of said housing or cap.

3. A device as claimed in claim 1, wherein said seal comprises a main body having a through bore for sealingly engaging about a shaft, the main body comprising a deformable seal body having an outer sealing surface and a larger diameter cap having an external surface and a rigidity greater than that of the seal body to transmit compressive force to the seal body when the seal is under axial compression and wherein said fluid relief passageway is provided between the through bore and the external surface of the cap.

4. A device as claimed in claim 3, wherein the fluid relief passageway is a radial channel provided in an end face of the larger diameter cap.

5. A device as claimed in claim 4, wherein a plurality of radial channels are provided between the through bore and the external surface of said cap.

6. A device as claimed in claim 3 wherein said deformable seal body comprises spring means to create a radial force against said bore when the seal is under compression by the end cap.

* * * * *